March 20, 1934.  G. W. SWIFT, JR  1,951,536
VARIABLE DRIVE MECHANISM
Filed June 8, 1933  4 Sheets-Sheet 1

INVENTOR
George W. Swift, Jr.
BY Knight Bros.
ATTORNEYS

March 20, 1934.  G. W. SWIFT, JR  1,951,536

VARIABLE DRIVE MECHANISM

Filed June 8, 1933  4 Sheets—Sheet 3

INVENTOR
George W. Swift, Jr.
BY
Knight Bros
ATTORNEYS

Patented Mar. 20, 1934

1,951,536

UNITED STATES PATENT OFFICE 1,951,536

VARIABLE DRIVE MECHANISM

George W. Swift, Jr., Bordentown, N. J., assignor to George W. Swift Jr., Inc., Bordentown, N. J., a corporation of New Jersey Application June 8, 1933, Serial No. 674,819

27 Claims. (Cl. 164—68)

This invention relates to variable transmission mechanisms suitable for variably timing the recurring operations of a particular part or machine; or varying its velocity of action while maintaining a predetermined periodicity in its recurring operations; or for variably correlating the successive functions of different parts or machines performed upon stock passing therethrough or in respect to timed relations between said operations.

Primarily, my invention is illustrated in an adaptation to variable drive mechanisms suitable for driving machines at variable speeds for the purpose of changing the frequency of operation of a periodically operated mechanism while at the same time regulating a variable ratio power-transmitting connection for synchronizing the speed of a periodically operated mechanism with the movement of the stock operated upon. As an illustration, my invention has been shown on the accompanying drawings in an adaptation to a variable speed cutting mechanism wherein a Reeves drive is employed for varying the periodicity of revolving cutter blades acting upon a web travelling at uniform speed and wherein variable ratio gearing preferably in the form of intermeshing elliptical gears are arranged between the Reeves drive and said cutter blades for angularly advancing or retreating the cutter blades during each cycle of their movements.

The primary object of my present invention is to provide an improved construction and arrangement of parts in a variable drive mechanism of the character referred to whereby two permanently geared cylinders, shafts, or parts of a machine may be variably adjusted with respect to each other. For this purpose, I employ a permanently geared power transmission between the relatively adjustable parts, including a variable motor-controlled connection for each of said parts. In the particular form illustrated in Figures 1 to 6 inclusive of the drawings, my invention contemplates a continuously running web-cutting mechanism driven by a variable speed power transmission for varying the periodicity of the cutting mechanism together with variable ratio gearing controlled by said motor-controlled connection whereby the linear velocity of the cutter blades may be synchronized with the speed of the web for different periodicities of the cutting operation. Another illustration of an advantageous use of my invention may be had in its adaptation to the relative adjustment of the blank-slotting, and printing units in a machine such as that shown in my copending application Serial No. 669,156 which was filed in my name under date of May 3, 1933.

Further and more specific objects of my invention will be found in certain particular constructions and arrangements of parts recited in the appended claims, reference being had to the specification and accompanying drawings.

Figures 1, 5, 6:
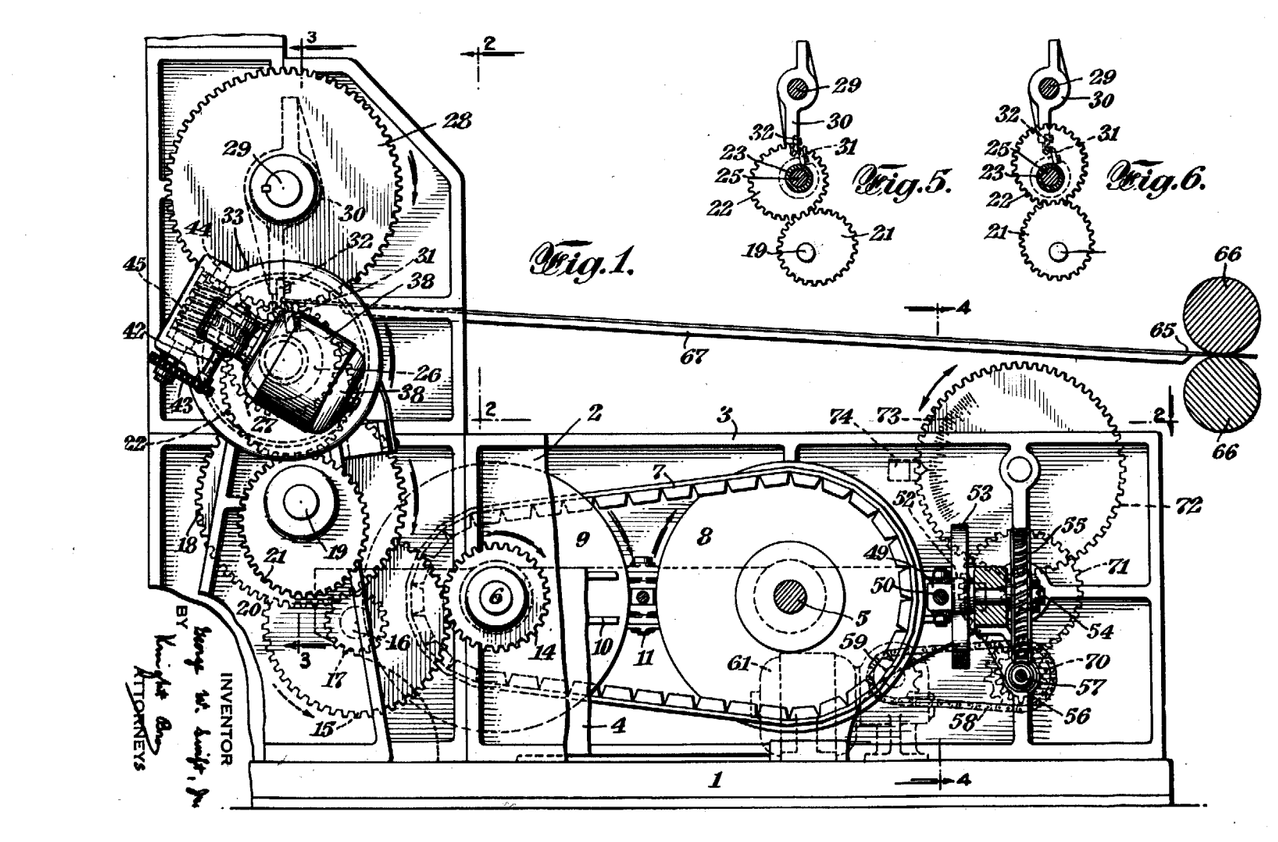
Figure 1 is a side elevation of a continuously operable web-cutting machine embodying the principles of my invention, parts being broken away and parts shown in section.
Figure 5 is a fragmentary detail in elevation on a reduced scale illustrating a 1:1 ratio of the elliptical gears when the cutter blades are in opposition.
Figure 6 is a fragmentary detail similar to Figure 5 showing the cutter blades in opposition with a 2:1 ratio of the elliptical gears.
Figure 2:
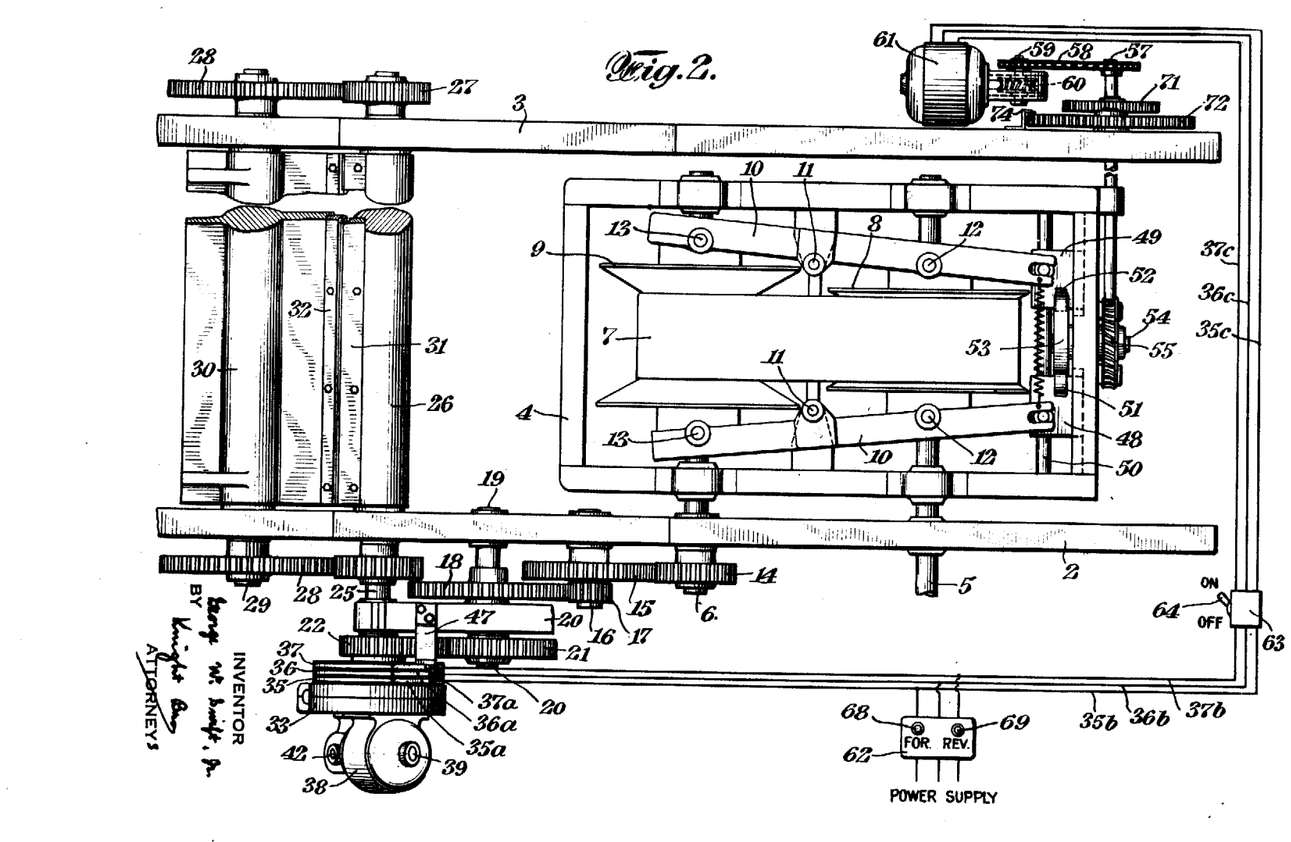
Figure 2 is a plan development of the power-transmitting gearing corresponding to the vertical line 2—2 and horizontal line 2—2, of Figure 1.
Figure 3:
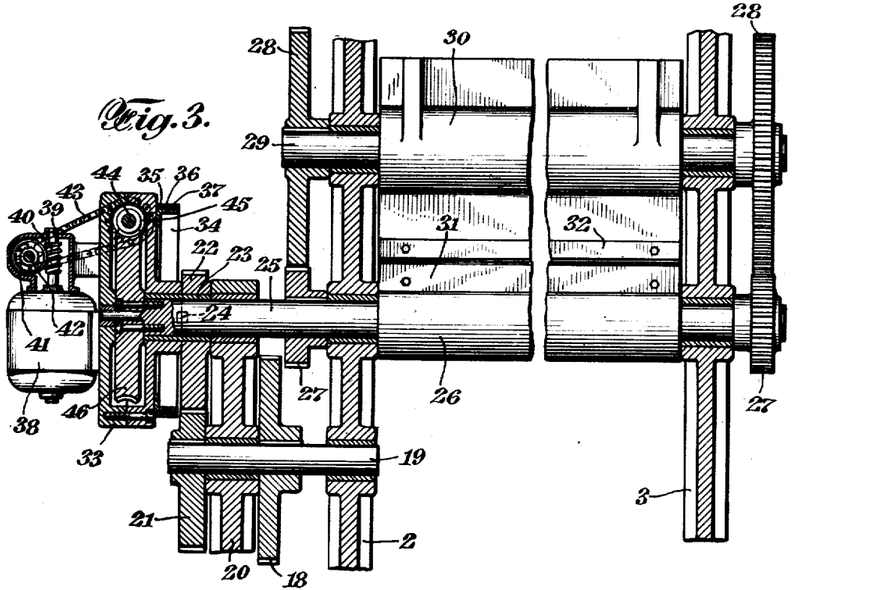
Figure 3 is a vertical cross-section of the cutting mechanism corresponding to the line 3—3, of Figure 1.
Figure 4:
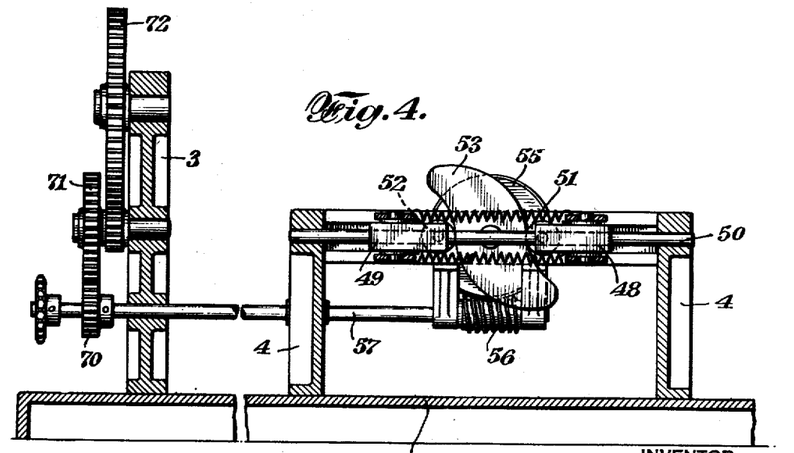
Figure 4 is a vertical cross-section of the motor-driven connections for adjusting the Reeves drive, said section corresponding to the line 4—4, of Figure 1, parts being broken away and parts shown in elevation.

As shown on Figures 1 and 4 of the drawings, the present embodiment of my invention is provided with a bed-plate 1 which carries the laterally spaced side frames 2 and 3 (shown best in Figure 2 of the drawings). A substantially rectangular frame 4 which is mounted upon the bedplate 1 between the side frames 2 and 3, serves to carry a variable speed transmission in the form of a Reeves drive. The Reeves drive comprises a constant speed shaft 5 to which power may be delivered from any suitable source (not shown on the drawings), a power delivery shaft 6, and an endless belt 7 for connecting cone pulleys 8 on the intake shaft 5 with the cone pulleys 9 on the output shaft 6. Arranged on opposite sides of the endless belt 7 are a pair of levers 10 pivoted at 11 in the frame 4, the pulley sections 8 being pivotally connected to the levers 10 by pivots 12 while the pulley sections 9 are pivotally connected at 13 to said levers 10 for varying the speed of the output shaft 6 by moving the levers 10 on their pivots 11. Keyed to the output shaft 6 is a spur pinion 14 which meshes with the larger spur gear 15 of a compound gear journalled upon a stud 16, the smaller gear 17 of said compound gear being in mesh with a large spur gear 18 which is keyed to a short shaft 19 journalled in the side frame 2 and in an outrigger frame 20. On the outer end of shaft 19 is keyed an elliptical spur gear 21 which meshes into a second elliptical spur gear 22. As shown in Figure 3 of the drawings, the upper elliptical gear 22 is keyed to a sleeve 23 by means of a key 24, said sleeve 23 being journalled upon a lower knife shaft 25 which carries a lower cutter drum 26. Keyed to the lower cutter shaft 25 are laterally spaced spur gears 27, said spur gears being arranged outside of the side frames 2 and 3 and meshing into larger spur gears 28 which are keyed to an upper cutter shaft 29 which is also journalled in the side frames 2 and 3 and carries an upper cutter drum 30. The cutter drums 26 and 30 respectively carry the cutter blades 31 and 32 which are adapted to move into opposition with respect to each other in the common plane of the axes of shafts 25 and 29. As shown best in Figure 3, a gear housing 33 is secured to and carried by the sleeve 23. Mounted upon the gear housing 33 and presented inwardly therefrom is an electrical conductor support or flange 34 which is provided with a forward drive conductor ring 35, a rearward drive conductor ring 36, and a common ground ring 37, said conductor rings being suitably connected up with a small motor 38 which is mounted upon the outer wall of the gear housing 33 and adapted to be driven forwardly or in reverse by the proper control of the energizing circuits therefor. The motor 38 is provided with an armature shaft 39 which carries a worm 40, said worm being in mesh with a small worm gear 41 keyed to a small shaft 42. The outer end of the shaft 42 is connected by a sprocket chain 43 to a worm shaft 44 which is journalled in the housing 33 and carries a worm 45 which meshes with a worm gear 46. As shown in Figure 3 of the drawings, the worm gear 46 is rigidly secured to the outer end of the lower cutter shaft 25 so that in the event that the elliptical gears 21 and 22 are held stationary while the small motor 38 is energized, the worm gear 46 will be rotated together with the lower cutter blade shaft 25 and result in an angular movement of the cutter blades 31 and 32 with respect to the elliptical gears 21 and 22. The effect of this adjustment will be to cause the cutter blades to come into opposition with each other under different gear ratios as shown, for example, in Figures 5 and 6, the former figure showing a relative position of the elliptical gears to produce a 1:1 power transmitting ratio, while the latter figure shows an arrangement which produces a power transmitting ratio of 2:1. For this purpose, the conductor rings 35, 36 and 37 are arranged in running contact with contact fingers 35a, 36a and 37a respectively, which are mounted upon a bracket arm 47 which projects outwardly from the outrigger frame 20 as shown in Figure 2 of the drawings.

Referring more especially to Figures 2 and 4 of the drawings, the outer ends of the levers 10 are connected by pin and slot connections to oppositely arranged blocks 48 and 49 which are reciprocably mounted upon a cross rod 50 in the frame 4 and carry cam rollers 51 and 52. Interposed between the cam rollers 51 and 52 is a double lobed cam 53 of the form shown in Figure 4, said cam 53 being keyed to a worm wheel shaft 54 to which is keyed a worm wheel 55. As shown in Figure 4, the worm wheel 55 meshes with a worm 56 on the inner end of a variable speed adjustment shaft 57. The outer end of the adjustment shaft 57 is connected by a sprocket chain 58 to a worm wheel shaft 59, a worm wheel 60 on said shaft being geared to the armature shaft of a small motor 61 which is also adapted to be reversably driven and may be of the same size and power as the motor 38 which operates the cutter adjustment hereinbefore referred to. A source of electrical energy may be connected up to the motors 38 and 61 through a switch box 62. Contact fingers 35a, 36a and 37a, may be connected thereto through circuit wires 35b, 36b, and 37b respectively. The same energizing circuits may be extended to the motor 61 through wires 35c, 36c and 37c respectively through a switch box 63 provided with a circuit-making and circuit-breaking switch arm 64. The operation of my improved variable speed drive in its adaptation to variable speed cutting mechanism will now be understood and briefly described is as follows.

The present embodiment of my invention contemplates the supply of a continuous web 65 of material which is delivered at uniform velocity between the feed rolls 66 over a feed table 67 to the revolving cutter blades 31 and 32. During any continuous run for cutting predetermined equal lengths from the travelling web 65, the motors 38 and 61 remain inactive, the former motor, however, being revolved continuously about the axis of the lower cutter shaft 25 during the periodic operations of the cutter blades. In the event that a different length is to be imparted to the successive sections cut from the web 65, a change in the length of the successive sections may be provided for by changing the frequency of the recurring operations of the cutter blades 31 and 32. This may be provided for by an adjustment of the variable speed drive which calls for the energization of the small motor 61 under the control of one or the other of push buttons 68 and 69. As the frequency of the cutter mechanism is changed, however, the cutting speed will be changed proportionately so that the cutter blades at opposition will be moving either faster or slower than the web 65 unless there is some compensation made in the cutting speed of the cutter blades in the manner described above. In a general way, with both motors 38 and 61 connected up to the power supply, a depression of push button 68 produces a simultaneous forward rotation of said motors. As a result, the accelerated periodicity of the cutting operation shortens the length of the cut sections while at the same time the position of the cutter blades with respect to the elliptical gears is changed to make the cutting speed of said cutter blades synchronize more or less precisely with the movement of the web 65. If, by chance, the simultaneous adjustment of the two motors does not produce an exact synchronism in these movements, the motor 61 may be cut out of circuit by the switch arm 64 and refined adjustments of the cutter blades with respect to the elliptical gears 21 and 22 made by pressing one or the other of the push buttons 68 and 69 for advancing or retreating the cutter blades until exact synchronization is secured. For the purpose of indicating the amount of adjustment imparted to the Reeves drive, the adjusting shaft 57 may be provided with a spur gear 70 (see Figure 1) which meshes with a large gear 71 of a compound gear, the smaller gear of said compound gear being in mesh with a large spur gear 72 which is provided with a circular scale 73 which moves past an indicator 74 mounted on the side frame 3.

Figure 7:
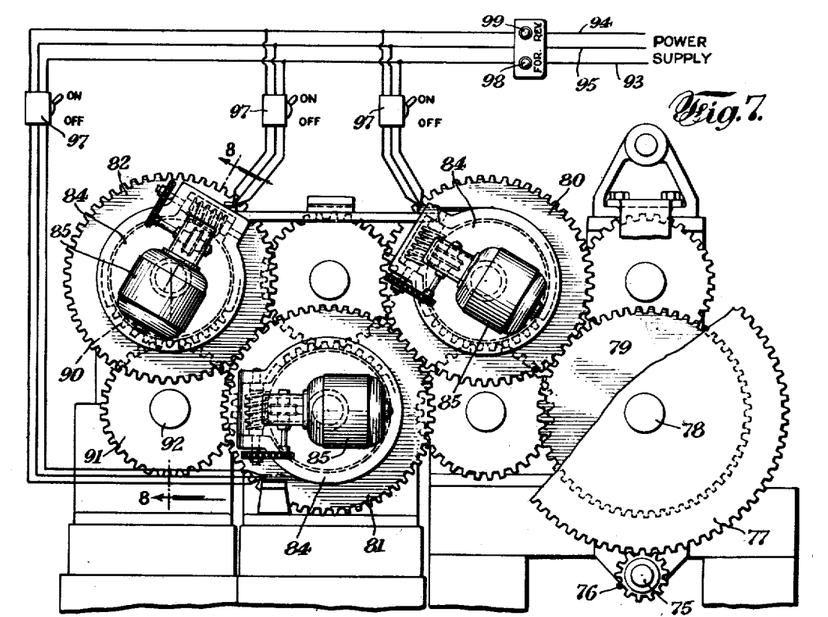
Figure 7 is a diagrammatic side elevation of another embodiment of my invention.
Figure 8:
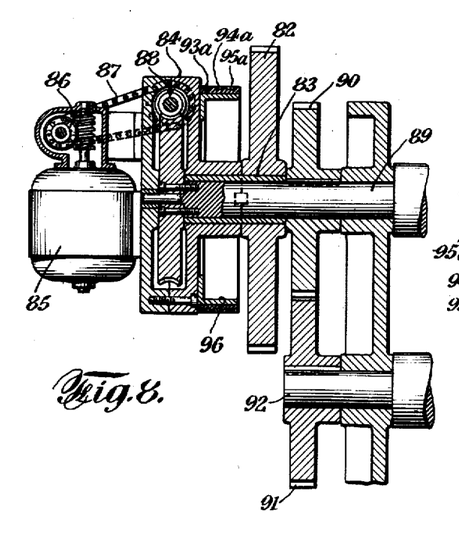
Figure 8 is an enlarged section corresponding to the broken line 8—8 of Figure 7, parts being shown in elevation.
Figure 9:
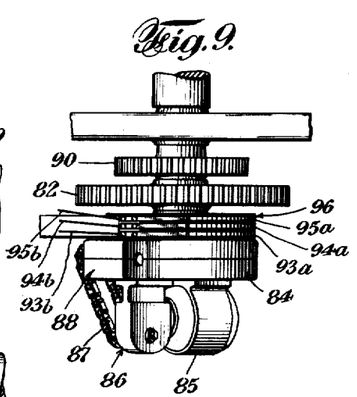
Figure 9 is a detached plan view of one of the motor-adjusted units shown in Figure 7.

Referring now to Figures 7, 8 and 9 of the drawings, these figures show an adaptation of my invention to the separate relative adjustment of a plurality of mechanisms such as the slotting and printing units shown in Figure 16 of the drawings in my copending application Serial No. 669,156 identified above or to the adjustment of said mechanisms as a group in relation to another mechanism or machine. According to this embodiment of my invention, a power shaft 75 carries a gear pinion 76 which meshes with a large gear 77 keyed to a shaft 78. A power-transmitting gear 79 which is also geared to the shaft 78, is connected up in train with a series of power-transmitting gears 80, 81, and 82, which may be adapted to drive the slotting, first printing, and second printing units referred to in my above-identified copending application. A description of the power connections for one of these units will serve for all. As shown in Figure 8 of the drawings, the gear 82 is keyed to a sleeve 83 upon which is also keyed a rotary housing 84. Mounted on the housing 84 and revolvable therewith is a motor 85 which operates through worm gearing 86, chain 87 and worm gearing 88, to drive a shaft 89 which may be the type cylinder of a printing press. A spur gear 90 which is keyed to shaft 89, meshes with a spur gear 91 on the shaft 92 which may be the shaft of an impression cylinder. Each of the adjustment motors is preferably a reversible motor adapted to be driven from a three-wire circuit comprising forward and reverse power lines 93 and 94 and a common return wire 95. Mounted on the housing 84 of each motor, is a circular flange 96 which carries three laterally-spaced contact rings 93a, 94a, and 95a which are connected through branch wires to the circuit wires 93, 94, and 95 respectively. In order to permit each of the motors to be operated separately or all of said motors to be operated simultaneously, each branch circuit is connected up through an "on and off" switch 97. As indicated in Figure 7 of the drawings, the motors may be operated forwardly by means of a push button 98 and in reverse by means of a push button 99.

I claim:—

1. In a machine of the character described, the combination with cooperating instrumentalities movable through different orbits of movement into and out of cooperating position during recurring periods, of driving connections for continuously operating said instrumentalities during said recurring periods, said driving connections including intermeshing gears for imparting an angular advance or retreat of said instrumentalities in their orbits, a support for one of said gears, said support being movable about the rotary axis of the other of said gears, and means mounted on said support for adjusting the gear on said support for imparting said angular advance or retreat.

2. In a machine of the character described, the combination with a rotatable shaft, of driving connections for said rotatable shaft, said driving connections including a gear connected to said shaft, a support movable about the rotary axis of said gear for rotating the latter, a second gear adjustable about its own axis on said support and revolvable with said support around the axis of the first-mentioned gear, said gears being permanently in mesh with each other, and a motor mounted on said support and connected to the gear on said support for imparting a relative movement of the first-mentioned gear with respect to said support.

3. In a machine of the character described, the combination with cooperating instrumentalities revolvable about parallel axes into and out of a common cooperating position, of intermeshing elliptic gears for varying the velocity of the instrumentalities during each cycle of their movements, a gear rotating in conformity with and transmitting power to said revolvable instrumentalities, an adjustment support rotatable by said elliptic gears, an adjustment gear journalled on said support, said adjustment gear being in mesh with the gear rotating in conformity with said revolvable instrumentalities, and a motor mounted on said support and connected to said adjustment gear for synchronizing the operating speed of said instrumentalities at cooperating position with the movement of the work.

4. In a machine of the character described, the combination with cooperating instrumentalities revolvable about parallel axes into and out of a common cooperating position, of power-transmitting mechanism for revolving said instrumentalities at variable periodicities, said power-transmitting mechanism including a gear rotating in conformity with and transmitting power to said revolvable instrumentalities, a rotary support rotatable about the axis of said gear, an adjustable connection journalled on said support for rotatably adjusting the gear rotating in conformity with said revolvable instrumentalities, and a motor mounted on said support and connected to said adjustable connection for synchronizing the operating speed of said instrumentalities with the movement of the work.

5. In a machine of the character described, the combination with cooperating instrumentalities revolvable about parallel axes into and out of a common cooperating position, of power-transmitting mechanism for revolving said instrumentalities at variable periodicities, said power-transmitting mechanism including intermeshing elliptic gears for varying the velocity of the instrumentalities during each cycle of their movements, a gear rotating in conformity with and transmitting power to said revolvable instrumentalities, an adjustment support rotatable by said elliptic gears, an adjustment gear journalled in said support and adjustably meshing with the gear rotating in conformity with said revolvable instrumentalities, and a motor mounted on said support and connected to said adjustment gear.

6. In a machine of the character described, the combination with cooperating instrumentalities movable into and out of cooperating relation to each other, of an elliptical gear for driving said instrumentalities, a motor movable over a closed path by said elliptical gear, a gear movable with said motor as the latter moves over said closed path, said gear being rotatable on its axis by said motor, and operating connections between said gear and said instrumentalities whereby the motion transmitted to the latter by the movement of said motor over its closed path is combined with the motion imparted to said connections due to the rotation of said gear by said motor.

7. In a machine of the character described, the combination with cooperating instrumentalities revolvable into and out of cooperating relation to each other, of a pair of intermeshing elliptical gears for revolving said instrumentalities, a rotary support rotatable by said elliptical gears, a motor mounted on said rotary support at a distance from the axis of rotation of the latter, a worm gear journaled on a fixed axis, said worm gear being operably connected to said cooperating instrumentalities, and a worm journaled upon said rotating support and meshing with said worm gear, said worm being adapted to be driven by said motor.

8. In a machine of the character described, the combination with two shafts, of intermeshing gears for rotating said shafts in unison, cutter blades revolvable by said shafts into and out of cooperative cutting position with respect to a continuously moving web, a variable speed drive, operating connections between one of said shafts and said variable speed drive, said operating connections including variable ratio gearing for transmitting power at variable angular velocity to said rotary shafts, an electric motor revolvable by said variable ratio gearing, and connections between said motor and said shaft, and means for energizing said motor to maintain the velocities of the cutter blades constant at their cutting positions.

9. In a machine for severing successive lengths from a continuous web, the combination with web-cutting means, of power-transmitting mechanism connected to said web-cutting means, said power-transmitting mechanism including a pair of intermeshing elliptical gears and an adjustable geared connection and a housing therefor connecting one of said elliptical gears to said cutting mechanism, and means carried by said housing for adjusting said geared connection whereby the cutting speed of said cutting mechanism may be synchronized with the velocity of the web for different periodicities of the cutting mechanism.

10. In a machine for severing successive lengths from a continuous web, the combination with web-cutting means, of a variable speed power-transmitting mechanism connected to said web-cutting means, said variable speed power-transmitting mechanism including a pair of intermeshing elliptical gears, a rotary adjustment support connected to one of said elliptical gears, a gear connected to said web cutting means, said gear being rotatable with and adjustable relatively to said adjustment support, a gear journaled on said support and meshing with the first-mentioned gear whereby the cutting speed of said cutting mechanism may be synchronized with the velocity of the web for different periodicities of the cutting mechanism, a motor mounted on said rotary adjustment support for driving the gear journaled thereon, and means for energizing said motor.

11. In cutting mechanism of the character described, the combination of a pair of rotary shafts geared together to rotate in unison, cutter blades mounted on said rotary shafts and movable thereby into and out of cutting relation, a gear unchangeably geared to one of said shafts, a housing for said gear, said housing being rotatable with and relatively to said gear, a motor mounted on and revolvable with said housing, operating connections between said motor and said gear, a pair of intermeshing elliptic gears for rotating said housing, a variable speed power-transmitting mechanism for driving said rotary cutter shafts with variable periodicities in the cutting operation, and an energizing circuit for said motor.

12. In cutting mechanism of the character described, the combination of a pair of rotary shafts geared together to rotate in unison, cutter blades mounted on said rotary shafts and movable thereby into and out of cutting relation, a worm gear positively connected to one of said shafts, a worm for adjusting said worm gear, a housing for said worm and worm gear, said housing being rotatable with and relatively to said worm gear, a motor mounted on said housing, operating connections between said motor and said worm, said worm being rotatably supported by said housing, a pair of intermeshing elliptical gears for rotating said housing, a variable speed drive connected to said intermeshing elliptical gears, and an energizing circuit for said motor.

13. In a machine for severing successive lengths from a continuous web, the combination with web-cutting means, of variable speed power-transmitting mechanism for driving said web-cutting means, said power-transmitting mechanism including variable ratio gearing and adjustable gearing interposed between said variable ratio gearing and said cutting mechanism, a motor revolved by and connected to said adjustable gearing for synchronizing the cutting speed of said cutting mechanism with the velocity of the web for different perodicities of the cutting mechanism, said variable speed power-transmitting mechanism being provided with means for adjusting the velocity of its power transmission, a motor for operating said velocity adjusting means, and means for energizing said motors.

14. A machine of the character claimed in claim 13, in which said motors are in the form of electric motors provided with energizing circuits whereby they may be energized separately or in unison with each other.

15. In cutting mechanism of the character described, the combination of a pair of rotary shafts geared together to rotate in unison, cutter blades mounted on said rotary shafts and movable thereby into and out of cutting relation, a housing rotatable with and relatively to one of said shafts, an adjustable operating connection arranged in said housing and connected to said shaft, a motor mounted on said housing, operating connections between said motor and said operating connection, a pair of intermeshing elliptical gears for rotating said housing and a variable speed power-transmitting mechanism connected to said elliptical gears.

16. In cutting mechanism of the character described, the combination of a pair of rotary shafts geared together to rotate in unison, cutter blades mounted on said rotary shafts and movable thereby into and out of cutting relation, a worm gear keyed to one of said shafts, a worm meshing with said worm gear, a housing for said worm and worm gear, said housing being rotatable with and relatively to the last-mentioned shaft, a motor mounted on said housing, operating connections between said motor and said worm, a pair of intermeshing elliptical gears for rotating said housing and a variable speed power-transmitting mechanism for driving said elliptical gears.

17. In cutting mechanism of the character described, the combination of a pair of rotary shafts geared together to rotate in unison, cutter blades mounted on said rotary shafts and movable thereby into and out of cutting relation, a worm gear keyed to one of said shafts, a worm meshing with said worm gear, a rotary housing for said worm and worm gear, said housing being rotatable with and relatively to the last-mentioned shaft, a motor mounted on said housing, operating connections between said motor and said worm, a pair of intermeshing elliptical gears connected to said rotary housing, a variable speed power-transmitting mechanism for varying the periodicity of the cutting operation through said elliptical gears and rotary housing, a motor for controlling the variable-speed power-transmitting mechanism, and energizing circuits for operating said motors.

18. In a machine of the character described, the combination with two shafts respectively rotatable about different axes, intermeshing gears for rotating said shafts in unison with each other, cutter blades respectively revolvable by said shafts into and out of cooperative cutting position with respect to a continuously moving web, a variable ratio power-transmitting gearing for varying the angular velocity of said rotary shafts during each rotation, differential mechanism for variably adjusting the angular positions of the cutter blades around the rotary axes of said shafts in respect to said variable ratio gearing, a variable speed drive connected to said shafts through said variable ratio power-transmitting gearing and differential mechanism, and means for simultaneously adjusting said variable speed drive and differential mechanism for changing the periodicity of the cutting operation while angularly adjusting the shafts with respect to said variable ratio gearing to maintain the velocities of the cutter blades constant at their cutting positions.

19. In a machine of the character described, the combination with two shafts rotatable in unison with and relatively to each other, a gear non-rotatably connected to one of said shafts, a second gear in mesh with the first-mentioned gear, a support in which the second-mentioned gear is journalled, said support being rotatable in unison with the other of said shafts, and means mounted on said support for rotating the second-mentioned gear.

20. In a machine of the character described, the combination with two shafts rotatable in timed relation to each other, a gear non-rotatably connected to each of said shafts, a rotary support coaxially arranged with respect to each of said gears, said supports being rotatable with and relatively to the gears to which they are respectively coaxially arranged, a gear rotatably mounted on each of said rotary supports and in mesh with the first-mentioned gear, and a motor mounted on each of said rotary supports and operably connected to the gear which is rotatably mounted thereon.

21. In a machine of the character described, the combination with a plurality of machine units constructed and arranged to operate successively on material passing therethrough, of a train of power-transmitting gears for connecting said machine units to operate in timed relation with each other, a variable operating connection between each of said gears and one of said machine units, said variable operating connection including a gear connected to said machine unit, a support rotatable about the axis of the gear connected to said machine unit, a pinion journalled on said support and meshing with said machine unit gear, and a motor mounted on said support for driving said pinion.

22. In a machine of the character described, the combination with a plurality of machine units constructed and arranged to operate successively on material passing therethrough, of a train of power-transmitting gears for connecting said machine units to operate in unison, and a variable operating connection between each of said gears and one of said machine units, said variable operating connection including a driven gear rotatable in unison with said machine unit, a support rotatable with and relatively to said driven gear, a normally stationary pinion journalled on said support and meshing with said driven gear, and a motor mounted on said support for driving said pinion.

23. In a machine of the character described, the combination with a plurality of machine units constructed and arranged to operate successively on material passing therethrough, of a power shaft for each of said machine units, a gear non-rotatably mounted on each of said power shafts, a support rotatable with and relatively to said power-shaft gear, a normally stationary pinion journalled on said support and in mesh with said power-shaft gear, a motor mounted on said support for driving said pinion, and a power-transmitting train including gears respectively connected to said rotatable supports.

24. In a machine of the character described, the combination of a plurality of cooperating units of said machine, a rotary shaft by means of which power is transmitted to each of said machine units, a rotary support rotatable about the axis of each of said rotary shafts and relatively to said shaft, a gear secured to each of said rotary power-transmitting shafts, a second gear journalled in each of said rotary supports, said second gears being in mesh with the first-mentioned gears respectively, a motor mounted on and revolvable with each of said rotary supports, and driving connections between said motors and the second-mentioned gears respectively.

25. In a machine of the character described, the combination with a plurality of cooperating machine units constructed and arranged to operate one after another on material passing through said machine, each of said machine units being provided with a power shaft, of a gear mounted on and rotatable with each of said power shafts, a second gear in mesh with and normally fixed with respect to each of the first-mentioned gears, means rotatable with each of the first-mentioned gears for journalling each of the second-mentioned gears with respect to an axis which is fixed in respect to the first-mentioned gear with which it is in mesh, a motor mounted on and revolvable with each of said rotatable gear-journalling means, operating connections between the motor and said second gear on each of said rotatable gear-journalling means, and means for independently energizing said motors for relatively adjusting the power shafts of said units while the machine is running.

26. In a machine of the character described, the combination with a rotary shaft, of a sleeve journalled upon said shaft, means for rotating said sleeve, a gear housing mounted upon and rotated by said sleeve, a driven gear secured to said rotary shaft within said gear housing, a pinion journalled within said gear housing and meshing with said driven gear, and a motor mounted on said gear housing and operably connected to said pinion for rotating said rotary shaft relatively to said sleeve.

27. In a machine of the character described, the combination with a rotary shaft, of a sleeve journalled upon said shaft, an elliptical gear keyed to said sleeve, a power-driven elliptical gear meshing with the first-mentioned elliptical gear, a gear housing mounted upon and rotated by said sleeve, a driven gear secured to said rotary shaft within said gear housing, a pinion rotatable about an axis which is fixed with respect to said gear housing and meshing with said driven gear, a prime mover mounted on said gear housing and operably connected to said pinion for rotating said rotary shaft relatively to said sleeve, and means under remote control for energizing said prime mover during the rotation of said housing.

GEORGE W. SWIFT, JR.

DISCLAIMER 1,951,536.—*George W. Swift, Jr.*, Bordentown, N. J. VARIABLE DRIVE MECHANISM. Patent dated March 20, 1934. Disclaimer filed November 10, 1934, by the assignee, *George W. Swift, Jr. Inc.*

Hereby enters this disclaimer to the claim of the aforesaid Letters Patent which is numbered 18 therein.

[*Official Gazette December 4, 1934.*]

gear meshing with the first-mentioned elliptical gear, a gear housing mounted upon and rotated by said sleeve, a driven gear secured to said rotary shaft within said gear housing, a pinion rotatable about an axis which is fixed with respect to said gear housing and meshing with said driven gear, a prime mover mounted on said gear housing and operably connected to said pinion for rotating said rotary shaft relatively to said sleeve, and means under remote control for energizing said prime mover during the rotation of said housing.

GEORGE W. SWIFT, JR.

DISCLAIMER 1,951,536.—*George W. Swift, Jr.*, Bordentown, N. J. VARIABLE DRIVE MECHANISM. Patent dated March 20, 1934. Disclaimer filed November 10, 1934, by the assignee, *George W. Swift, Jr. Inc.*

Hereby enters this disclaimer to the claim of the aforesaid Letters Patent which is numbered 18 therein.

[*Official Gazette December 4, 1934.*]